United States Patent [19]

Easwaran et al.

[11] 3,945,819

[45] Mar. 23, 1976

[54] FERROUS METAL NETWORK IMPREGNATED WITH MAGNESIUM METAL

[75] Inventors: Jairaj Easwaran, Toledo, Ohio; George S. Foerster, Hightstown, N.J.

[73] Assignee: N L Industries, Inc., New York, N.Y.

[22] Filed: Oct. 15, 1974

[21] Appl. No.: 514,630

Related U.S. Application Data

[63] Continuation-in-part of Ser. No. 454,951, March 26, 1974, Pat. No. 3,902,892, which is a continuation-in-part of Ser. No. 385,584, Aug. 3, 1973, abandoned.

[52] U.S. Cl. ................... 75/53; 29/184; 75/130 A
[51] Int. Cl.$^2$ ....................... C21C 7/02; B21C 1/00
[58] Field of Search ............... 75/53, 58, 130 A, 65

[56] References Cited
UNITED STATES PATENTS

| | | | |
|---|---|---|---|
| 3,396,777 | 8/1968 | Reding | 75/130 R |
| 3,459,541 | 8/1959 | Hohl | 75/130 A |
| 3,634,066 | 1/1972 | Mathews | 75/65 |
| 3,637,373 | 1/1972 | Bylund | 75/58 |

*Primary Examiner*—Peter D. Rosenberg

[57] ABSTRACT

A composition of matter comprising a mass of ferrous scrap pieces compressed together in random orientation forming a network of interlocking pieces has been prepared. The ferrous metal network has a density of 1.2 to 6.3 g/cc, a porosity of 20 to 85%, and a short transverse tensile strength (S.T.T.S.) of at least 2.0 psi, preferably at least 2.5 psi.

This ferrous metal network may be impregnated with magnesium in amount from 5 to 55% by weight of the impregnated body. The magnesium impregnated body is useful for treating high melting metals, such as ferrous metal to reduce the sulphur content and to produce nodular iron.

4 Claims, No Drawings

FERROUS METAL NETWORK IMPREGNATED WITH MAGNESIUM METAL

This application is a continuation-in-part of our copending application Ser. No. 454,951, now U.S. Pat. No. 3,902,892 filed Mar. 26, 1974, which in turn is a continuation-in-part of our parent application Ser. No. 385,584, filed Aug. 3, 1973, and now abandoned.

BACKGROUND OF THE INVENTION

In the iron and steel industry, it is necessary to treat the ferrous base metals while in the molten state with a desulfurizing agent to reduce the sulphur content of the metal product. Magnesium metal is a powerful deoxidizer and desulfurizer. However, magnesium metal boils at a low temperature and therefore, the sudden increase in volume which is produced when metallic magnesium is added to the molten iron, may result in violent reactions as the magnesium metal is vaporized.

Various methods have been used to reduce this violent activity by slowly introducing the magnesium metal into molten ferrous metal under rigidly controlled systems. One of these methods for reducing the violence is to impregnate porous bodies with magnesium metal and to introduce these magnesium impregnated porous bodies into the molten ferrous metal. Under these conditions, the impregnated magnesium metal is released at a slow enough rate that the violence is held to minimum.

Among the known porous bodies which have been used with limited success for this purpose are: porous coke, carbon, graphite and ceramic bodies such as quicklime, lump limestone or dolomite and the like.

In addition, magnesium has been infiltrated into porous iron bodies. Among these prior art iron bodies is sponge iron in which the iron particles are very small and are sintered together to form a porous structure. Sponge iron itself is expensive to produce and to use. The cost of forming large porous structures from sponge iron is also an expensive procedure.

Since the pores of the sponge iron are excessively small, they tend to release the magnesium too slowly when immersed into the molten iron, and the release may be too quiescent for optimum operation. Sponge iron also may contain oxides which may form a violent reaction with the magnesium which may also impair the efficiency.

Another method used by the prior art to produce iron briquettes containing magnesium is to dry-press together iron particiles and magnesium particles, both of which preferably are from 4–60 mesh.

When these compressed iron and magnesium particles are used to desulfurize molten iron, the remaining iron structure becomes decidedly weak as the magnesium melts and, therefore, the magnesium may be released too quickly and therefore may cause a violent reaction.

In contrast to these prior art products, the instant invention prepares a network of ferrous metal pieces, particularly steel turnings, compressed together which forms a body having a low density, high porosity, and high strength which may be infiltrated with large quantities of magnesium metal.

The voids in the metal network are sufficiently large to release the magnesium at a desirable rate, i.e., fast enough to provide rapid treatment, but not too fast so that the treatment is unduly violent.

It has been found that the porous ferrous metal network of the instant invention possesses advantages which are not present in the prior art porous bodies.

SUMMARY OF THE INVENTION

A new composition of matter has been prepared comprising a mass of scrap ferrous metal pieces compressed together in random orientation, forming a network of interlocking pieces, said mass having a density of 1.2 to 6.3 g/cc, a porosity of 20 to 85%, and a short transverse tensile strength of at least 2.0 psi, preferably at least 2.5 psi.

Within these broad limits, it has been found that these limits may be divided into two types of products, each product is useful for its own particular purpose. It has been discovered that the compressed scrap metal bodies impregnated with magnesium metal are particularly useful for desulfurizing molten iron metal when the scrap bodies contain the following properties:
 network of ferrous metal scrap pieces compressed to form the metal network having a density of 1.2 to 4.0 g/cc;
 porosity of 50 to 85%;
 short transverse tensile strength of at least 2 psi;
 impregnated with from 18 to 55% magnesium metal.
This metal scrap network impregnated with 18 to 55% magnesium metal and the process for preparing this product is claimed in copending application Ser. No. 454,951, and parent application Ser. No. 385,584.

Compressed scrap metal bodies impregnated with magnesium metal which fall within these limitations when used to desulfurize molten iron releases the magnesium metal at a rapid rate without producing a violent reaction. Although this product may also be used sucessfully to produce nodular iron, it has been found that the magnesium infiltrated metal network containing less magnesium metal is generally more efficient and causes less fuming. This product possesses the following properties:
 the network of iron pieces compressed to form the body has a density of 6.5 down to 4.0 g/cc, a porosity of 20 up to 50%, a short transverse tensile strength of at least 2.0 psi and is impregnated with from 5% up to, but not including 18% magnesium metal When this product is used to produce nodular iron, the reaction of the magnesium is slower and, therefore the utilization efficiency of the magnesium values is high, since a very small amount of the magnesium is lost by volatilization.

These masses of porous ferrous metal networks contains a labyrinth of interstices in the voids between the compressed interlocking metal pieces. These interstices may be filled with magnesium metal by immersing the ferrous metal network in molten magnesium metal, and solidifying the molten metal impregnated throughout the interstices of the porous metal network. The amount of magnesium which may be impregnated into the ferrous metal mass may be from 5 to 55% by weight of the impregnated body. This product is useful for treating ferrous melts, for example, for desulfurizing the melts and also for producing nodular iron. Normally about ¾ to 1½ pounds of magnesium metal are used to desulfurize 1 ton of molten iron. About 2 to 4 more pounds of magnesium are used to form one ton of nodular iron, which therefore requires a total of from 2¾ to 5½ pounds of magnesium for each ton of nodular iron.

DESCRIPTION OF THE PREFERRED EMBODIMENTS

This composition of matter is produced by selecting scrap metal pieces, particularly steel turnings which fall within the following size ranges:

| | |
|---|---|
| length | 1/8 to 9 inches |
| width | 1/64 to 1 inch |
| thickness | 1 to 100 mils |

Scrap metal pieces within this size range usually have a bulk density of from 0.1 to 1.0 g/cc.

In the instant application these metal pieces are then compressed to form a ferrous metal network having a density of from 6.3 down to 4.0 g/cc. As stated previously, the porosity of the network is 20 to 50% and it has a short transverse tensile strength of at least 2.0 psi.

This ferrous metal network is then immersed into molten magnesium metal and held in the molten metal for a few minutes to impregnate the interstices of the metal network. The impregnated body is removed from the molten magnesium and it is cooled to solidify the molten magnesium.

The impregnated metal is cooled, preferably in the absence of an oxidizing atmosphere. One preferred method of cooling the impregnated compressed metal body is to immerse the impregnated body into an oil bath.

The final product comprises a porous composition of matter comprising a compacted metal network impregnated with magnesium metal. The composition contains from 5% up to but not including 18% magnesium metal by weight of the total impregnated metal body.

The porous ferrous metal network composition of the instant invention when impregnated with magnesium is superior to the porous bodies of the prior art. The instant porous body, not only may take up and retain magnesium in the desired amounts, but in addition, when used to desulfurize iron or to form nodular iron, the porous body releases the magnesium metal over a short period of time without creating a violent reaction. It also has a structural strength which is retained as the magnesium is being released. This is advantageous, since the maintenance of the structural strength is necessary to prevent a violent reaction from taking place, for the magnesium is released in a controlled manner. In addition it is also advantageous to employ this particular type of magnesium infiltrated porous body over other types of magnesium impregnated bodies, since the residual ferrous metal in the porous body may be dissolved in the molten metal without having to remove the residual carrier. It has also been found that this particular type of ferrous metal body possesses sufficient strength to withstand handling prior to infiltration, while at the same time possesses a porosity which will hold the desired amount of magnesium metal.

In addition to producing a product which has all of these advantages, the porous body of the instant material may be made with raw materials, which are readily available.

The density of the compacted ferrous metal network before impregnation in the instant application is from 6.3 down to 4.0 g/cc, while the density of the scrap metal pieces before compaction was 0.1 to 1.0 g/cc. Metal porous bodies containing amounts of magnesium metal from 5% up to, but not including 18% may be produced by this process. Reproducible products are also readily obtained.

If the density of the compressed ferrous metal body is above 6.3 g/cc, the amount of magnesium which will infiltrate the compressed body will be below 5% by weight. When the magnesium content is below 5%, a large amount of scrap metal is added with the magnesium to the molten iron, and the molten metal may be cooled substantially. This cooling effect may be undesirable. As previously stated, the amount of magnesium infiltrated in the scrap iron body, preferably, should be less than 18% when used to produce nodular iron. Above this amount the reaction is very rapid, yet not violent. Within this range the reaction is still rapid, but slow enough to prevent the magnesium values from volatilizing excessively.

The scrap metal pieces useful in the instant invention include ductile iron and the like, but more preferably steel. The scrap metal pieces, as previously stated, must fall within the size ranges specified above. If the scrap pieces used in this invention lie outside the specified size range, difficulties may be encounterd in infiltrating the metal network and/or the rate of release of the magnesium may not be desirable.

The most desirable type of scrap metal are those which are irregular in shape and have a variety of sizes which fall within the sizes specified. Fine metal turnings, short shovelings and the like are the most desirable.

The compacted metal porous bodies prepared in the instant invention also may be impregnated with alloys. Alloys particularly desirable to use are magnesium alloys containing alkaline earth metals, aluminum, silicon, and rare earth metals such as cerium, lanthanum, or rare earth alloys, such as "Misch Metal" and mixtures of these metals. The term "magnesium" hereinafter referred to is meant to include magnesium metal and alloys of magnesium metal. The alloy must occupy the same volume as the 5% up to but not including 18% by weight.

The magnesium infiltrated compacted porous steel network structure produced in the instant invention possesses the following combined advantages over the prior art:

1. have a range of porosities and therefore are capable of retaining the desired quantities of magnesium metal;
2. the impregnated bodies produced are structurally strong and capable of withstanding high temperatures until the magnesium has been released during subsequent treatment of molten iron.
3. the impregnated bodies which contain from 5% up to, but not including 18% magnesium, when used to form nodular iron, produces reaction which is still rapid, but slow enough to prevent excessive volatilization of the magnesium values. Reaction times to release the magnesium metal from the impregnated bodies may range from ½ to 10 minutes.
4. the magnesium infiltrated bodies made by the instant invention are uniform in composition, and when they are used to treat molten iron, reproducible results are obtained.
5. the addition of the particular type of magnesium impregnated body employs iron or steel as the carriers to the molten iron which subsequently do not have to be removed from the molten iron.

6. the scrap metal may melt after the magnesium has been released, thus contributing iron to the melt and eliminating the necessity of removing the carrier after the treatment.

Scrap metal generally contains a coating of oil. This coating may be removed before infiltration, if desired. One method of degreasing is by heating the scrap to burn-off the oil. This heating may be done before or after compressing. It is economically advantageous, however, to compress the scrap metal, then heat the compressed metal to remove the oil, and to preheat the metal at the same time before it is introduced into the molten magnesium for infiltration.

If the compressed metal is preheated before introduction into molten magnesium, care should be taken to prevent the scrap metal from oxidizing excessively. The oxide present can react with magnesium metal, and may contribute to the violence during the subsequent treatment of the ferrous melts and may consume a significant amount of magnesium, thus lowering the efficiency.

It has been found that the weight gain of the scrap metal compressed network due to oxidation should not exceed about 3% and, preferably, not exceed about 1% during the preheating step.

The amount of oxidation may be held within the limits specified, if the preheating temperature in air is held between about 500° and 1000° F. Temperatures up to about 1200° F. may also be employed, if the time of preheating is held to no more than about 1 hour.

Obviously, the preheating temperature upper limits are not critical, if the preheating is carried out in a non-oxidizing atmosphere.

Care should also be taken in the storage of the magnesium infiltrated bodies to avoid reaction of the magnesium with moisture. This may be readily accomplished by sealing the infiltrated bodies in a suitable container or placing the infiltrated bodies with a drying agent in a metal can having a tight fitting lid.

In order to describe the instant invention more fully, the following examples are presented:

EXAMPLE 1

In this example a scrap steel briquette was prepared using a roll briquetting machine. The machine specifications were as follows:

Roll Diameter — 12 inches
Number of Briquettes — 32
Roll Motor — 20 Horsepower
Feeder Motor — 5 Horsepower The roll separation was adjusted to give a density in the briquettes of 6.2 g/cc.

The steel turnings used in this example were 5 to 10 mils thick, ⅛ to 7/16 inches in width, and ⅜ to 2 inches in length.

The steel turnings were fed into the worm gear type feeder and the roll motor speed was adjusted to 6 RPM. The finished briquettes were 1¾ inch length by ¾ inches wide by ½ inch deep. Each briquette weighed approximately 46 g. An accurate measurement of the volume was made by the mercury displacement method. The volume was 7.4 cc. After burning off the oil in an oven at 900° F, the briquettes were immerged in molten magnesium. The average weight gain due to the infiltration of magnesium metal was found to be 6%.

EXAMPLE 2

Using the procedure described in Example 5, the roll separation was increased with shimstock to yield a lower density of 5.1 g/cc of the briquettes. The briquettes weighed 38 g. and the volume was determined to be 7.5 cc. The finished briquettes were again immerged in molten magnesium and the average weight gain was found to be 12%.

EXAMPLE 3

The 6% magnesium containing products as prepared in Example 1 were used to prepare ductile iron. The amount of iron treated was 2400 lbs. at 2650° F. The amount of product added was 54 lbs. This amounted to an addition of magnesium of 2.7 lbs. per ton of metal treated. The initial sulphur in the iron was 0.035%. The release time of magnesium was determined to be approximately 50 seconds. The final sulphur in the iron was determined to be 0.007%. The iron produced was ductile. The residual magnesium was measured at various times after treatment as follows:

| TIME | RESIDUAL MAGNESIUM |
| --- | --- |
| 0 | 0.035% |
| 1 min. 30 sec. | 0.034% |
| 3 min. | 0.033% |
| 4 min. 30 sec. | 0.033% |
| 6 min. | 0.033% |

EXAMPLE 4

The 12% magnesium product as prepared in Example 2 was used to prepare ductile iron. The amount of metal treated was 2400 lbs. at 2680° F. Thirty lbs. of the product were added. This is equivalent to the magnesium addition of 3 lbs. per ton of metal treated. The initial sulphur in the iron was 0.037%. Time of reaction was approximately 1 min. The final sulphur in the iron was determined to be 0.010%. The iron produced was ductile. Residual magnesium as a function of time is tabulated below:

| TIME | RESIDUAL MAGNESIUM |
| --- | --- |
| 0 | 0.035% |
| 1 min. 30 sec. | 0.035% |
| 3 min. | 0.033% |
| 4 min. 30 sec. | 0.033% |
| 6 min. | 0.034% |

EXAMPLE 5

In this example steel turnings of the same size as those described in Example 1 were used.

78.5 Grams of the above turnings were inserted in a compaction chamber (1¾ inch dia. × 3 inch high). The turnings were compacted at 24 tons/in.$^2$ to produce a briquette 1.858 inch dia. × 0.315 inch high. The density of the briquette was 5.61 g/cc.

The compacted briquette was preheated at 960° F for 10 min. which allowed all oil on the turnings to burn off. The briquette was reweighed and found to weigh 77.5 g. The oil removed was 1.3% by weight.

The briquette was then immersed in molten Mg at 1400° F for 10 min. After the infiltration the briquette was removed from the molten Mg and cooled, the briquette was reweighed. It was found to weigh 88.0 g and contained 11.9% Mg metal by weight.

EXAMPLE 6

In this example 167 grams of the same steel turnings were compacted in a compaction chamber which was 1¾ inch dia. and 6 inches high at 50 tons per sq. in. The briquette was 1.8 inch dia. and 0.653 inch high. The density of this briquette was 6.13 g/cc.

The compacted briquette was preheated at 960° F for 10 min. which allowed all oil on the turnings to burn off. The briquette was reweighed and found to weigh 153.0 g. The oil removed was 8.4% by weight.

The briquette was then immersed in molten Mg at 1400° F for 10 min. After the infiltration the briquette was removed from the molten Mg. and cooled, the briquette was reweighed. It was found to weigh 171.0 g. and contained 10.5% Mg. metal by weight.

When the briquettes prepared in Example 5 and 6 were used to treat molten iron, it was found that the release of the magnesium metal was rapid but excessive loss of magnesium did not occur.

In the following examples, alloys of magnesium were used to infiltrate the scrap metal network instead of using magnesium metal alone.

EXAMPLES 7-8

In these runs, the steel turnings described in Example 1 were inserted into a compaction chamber (1¾ inch diameter × 3 inches high) at a compaction pressure of 11.0 tons per sq. in. The briquettes produced measured 1.86 inches diameter × 0.36 inch high. The density of the briquettes were 4.6 g/cm³.

The compacted briquettes in Example 7 were then preheated to 800°F for 30 minutes which allowed the oil on the turnings to burn off. After preheating, the compacted briquettes in Example 7 were immersed in a melt of an alloy of magnesium metal containing 50% "Misch Metal" for 10 minutes and the briquettes contained 17.7% magnesium — Misch Metal by weight.

In Example 8 briquettes having a density of 4.96 g/cm³ were employed. The preheated briquettes were immersed in a melt of magnesium metal containing 16% by weight calcium metal for 10 minutes and the infiltrated briquette contained 15.0% magnesium-calcium metal by weight.

These briquettes prepared in Examples 7–8 which contained "Misch Metal" and calcium in addition to the magnesium metal may be used in the same manner as the briquettes prepared in the previous examples for treating molten iron metal.

From the above description and by the examples presented, a superior type of product has been produced which comprises a ferrous metal network having high strength which may be infiltrated with the desired percentages of magnesium metal.

Such a product is superior to prior art products when used to produce nodular iron.

While this invention has been described and illustrated by the examples shown, it is not intended to be strictly limited thereto, and other variations and modifications may be employed within the scope of the following claims.

We claim:

1. A composition of matter comprising a mass of ferrous metal pieces and magnesium, useful for treating molten iron to produce nodular iron, said scrap pieces being of random sizes compressed together in a haphazard order forming a metal network of interlocking pieces, said pieces having individual sizes in which the length of the pieces is from ⅛ to 9 inches, the width is from 1/64 to 1 inch, and the thickness is from 1 to 100 mils, and voids between said pieces forming a labyrinth of interstices throughout said network, said metal network having a density of from 6.3 down to 4.0 g/cc, the interstices in said network forming a porosity of from 20 to 50%, said metal network having a short transverse tensile strength of at least 2 psi, said magnesium filling said interstices, the amount of magnesium in said interstices being from 5% up to, but not including 18% by weight of the total weight of said metal network containing the magnesium.

2. Composition according to claim 1 in which said metal network is impregnated with magnesium metal.

3. Composition according to claim 1 in which said metal network is impregnated with a magnesium alloy.

4. Composition according to claim 2 in which the scrap pieces employed are scrap steel turnings.

* * * * *